Jan. 27, 1970   J. D. HOSKINSON   3,492,307
METHOD FOR MOLDING THERMOPLASTIC MATERIAL
Filed Feb. 27, 1967
3 Sheets-Sheet 2

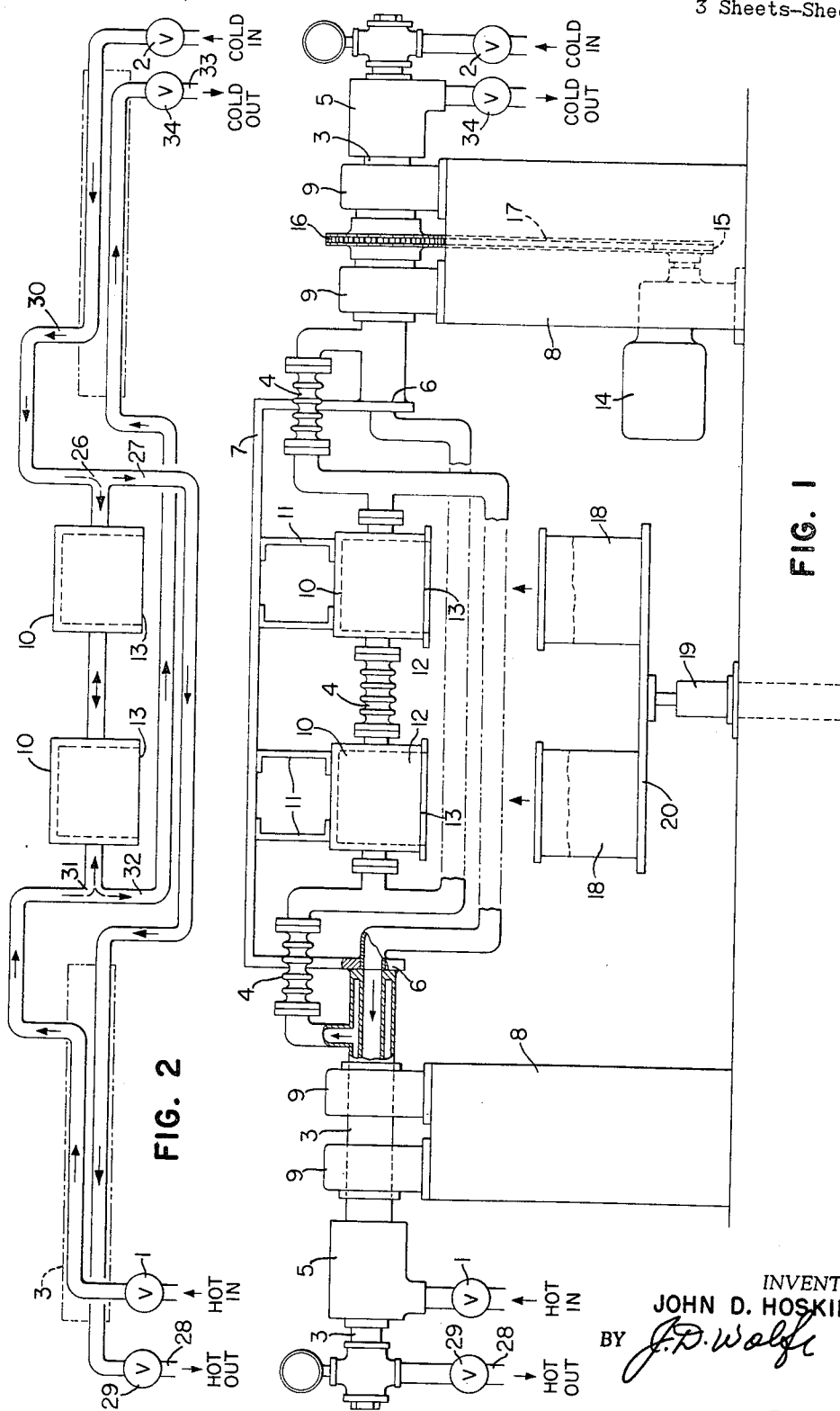

INVENTOR.
JOHN D. HOSKINSON
BY J.D. Wolf
ATTORNEY

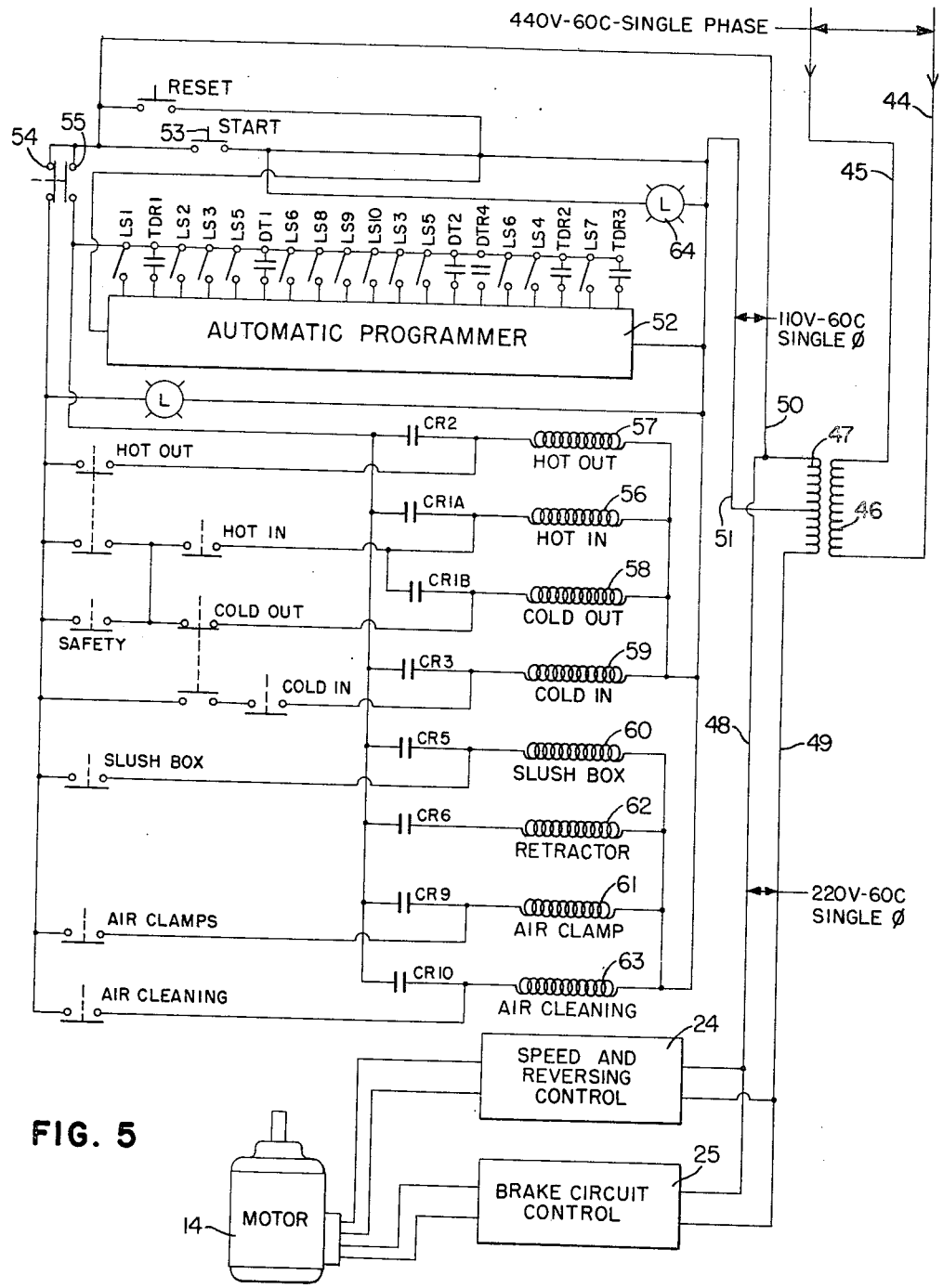

United States Patent Office 3,492,307
Patented Jan. 27, 1970

3,492,307
METHOD FOR MOLDING THERMOPLASTIC MATERIAL
John D. Hoskinson, Cuyahoga Falls, Ohio, assignor to The Goodyear Tire & Rubber Company, Akron, Ohio, a corporation of Ohio
Filed Feb. 27, 1967, Ser. No. 618,705
Int. Cl. B29c 5/04; B28b 1/20
U.S. Cl. 264—302      2 Claims

ABSTRACT OF THE DISCLOSURE

This invention provides a method for molding thermoplastic material. The method deals with heating and cooling the mold to obtain a short mold cycle while the molds are rotated to load and unload the molding material from the slush box and specifically with the manner in which the heating medium is supplied to and removed from the mold.

---

This invention relates to an apparatus for molding thermoplastic material and to the method of using said apparatus. More particularly, this invention relates to an apparatus which permits molded articles to be made with relatively short molding cycles and therefore permits material to be shaped in a more economical manner.

Heretofore in molding thermoplastic material it has been the practice to mold these either in a liquid or solvent system wherein it was necessary to move the molds in rotation about several axes and to add a measured amount of material. Also, this molding equipment is not particularly well suited or adapted to use with a powdered thermoplastic material where the powdered material is held in a slush box and is added to the mold when the mold is rotated and later the excess is dumped. Also, we have discovered that the control of the heating cycle with the powdered material has a certain degree of criticality or otherwise the material formed within the mold tends to have bubbles along the interior surface.

This invention has for its objects the provision of an apparatus for molding powdered thermoplastic material whereby the molded material is obtained free of bubbles and in fairly short molding cycles to thereby permit molded articles to be formed at a relatively high rate and more economically by this method of using said apparatus.

Figure 3:
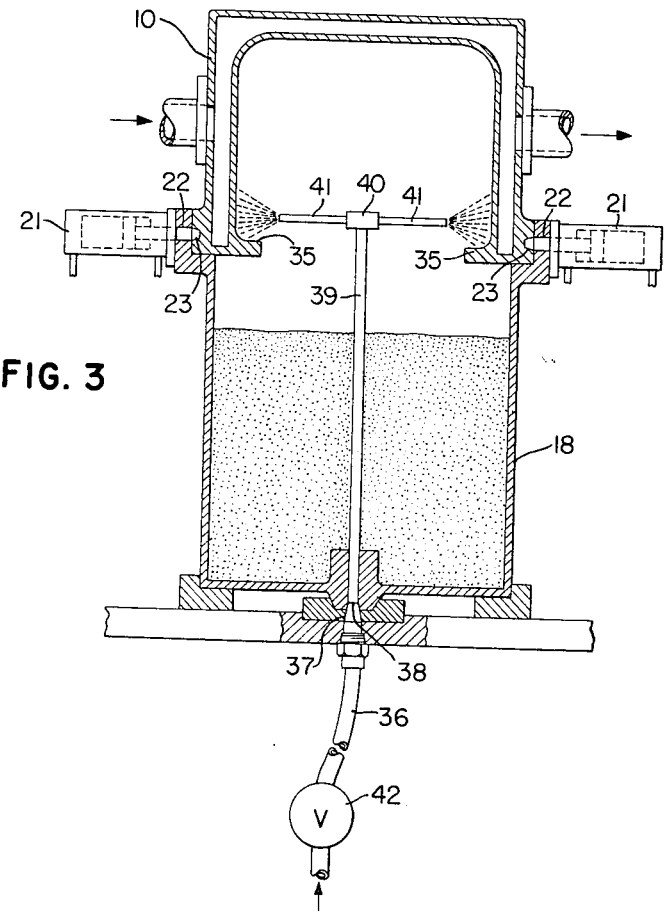
Figure 4:
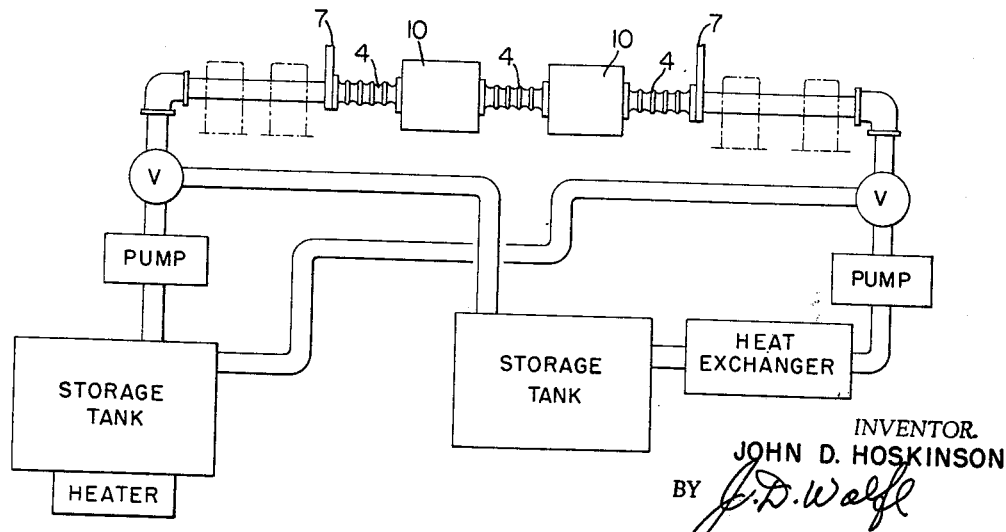

In accordance with these objects this invention may be accomplished in the following manner which may be more clearly understood by reference to the drawings wherein FIG. 1 is a side elevational view of the molding apparatus and FIG. 2 is a piping diagram showing an improved method of flowing the hot and cold medium through the apparatus. FIG. 3 is an enlarged detailed cross section through one of the molds and a slush box, while they are locked in register. FIG. 4 is another piping diagram showing the flow of the hot and cold oil through the apparatus. FIG. 5 is an electrical wiring diagram showing the relationship of the automatic programmer to the control circuits and the motor circuits.

With reference to FIG. 1 it should be evident that numeral 1 indicates the hot oil inlet valve and numeral 2 indicates the cold oil inlet valve into the conduit 3 which contains flexible members 4 therein to absorb the vibrational shock and thermal expansion during the heating and cooling cycles as well as during the rotation of the mold. Numeral 5 represents the rotary joints 5 and numeral 6 represents the mounts for the mold carrier 7. It should be noted that the mold carrier 7 is rotationally mounted in the rotary bearings or pillow blocks 9 positioned on top of the stanchions 8. Also, the mold carrier 7 has mounted therein at least one mold 10. This mold is mounted on the frames 11 and held in fluid connection therein by means of the flexible joint 4 as shown in the drawings. These flexible joints form part of the conduit for connecting the molds with the source of the temperature varying medium such as the hot and cold oil. Although the molds are mounted within the mold carrier in such a manner that the mold carrier may be rotated within the mounts therefor, the mold is held in a fixed relation relative to the mold carrier.

The molds as used, contain a cavity 12 therein which is of the size and design of the article to be molded. Preferably the cavity has engraved or etched therein the desired aesthetic designs such as an engraving that would give the molded articles a grain or other highly decorative effect. Also, this engraving may be such as to give the effect of a simulated stitching or other features to represent actual fabricated articles that are stitched, sewn or glued together in the normal manner of forming coverings for cushions and related articles. The cavity containing the decorated effect also has an opening 13 to permit the molding powder or thermoplastic material to be added to the cavity and then be molded to form the desired article.

The manner in which the heating and cooling medium flows into and through the molds in FIG. 1 is better understood by reference to FIG. 2. The rotation of the mold carrier is achieved by controlling the direction of rotation of the motor 14 which is connected to the drive sprocket 15. In turn the drive sprocket 15 is connected in a driving relationship with the sprocket 16 of the mold carrier by the sprocket chain 17. Thus, the rotation of the motor causes the sprockets to drive the chain and thereby rotate the mold carrier about the axis of rotation. Thus the mold carrier may be rotated through a series of complete revolutions or any increment of an arc up to 180° or more as well as rocked through an arc of at least 180° by suitable manipulation of the speed control and reversing current to the motor and the brake circuit.

In the operation of the apparatus of FIG. 1 using a dry powder type plasticized polyvinyl chloride, the hot oil is first heated to a temperature of about 500 to 550° F. with the preferred temperature being about 520 to 540° F. by a suitable means such as gas flame or electrical heaters (not shown). Then the hot oil valve 1 is opened and the hot oil is pumped through the conduit into and through the mold as shown in either FIG. 1 or FIG. 4 although the pump at the oil source is not shown. It should be appreciated that the pump should be piped to permit the return of oil to the supply tank when the valves to the molds are closed. Usually about 10 seconds after the slush box 18 is raised by the action of hydraulic ram 19 on slush box carriage 20 or other suitable means and brought into register with the cavity opening 13 of the mold, the mold and slush box are locked in place relative to each other as best seen in FIG. 3. This action of locking the slush box and mold together is achieved preferably by means of clamps 21 which are activated by hydraulic rams or other means to move the plunger 22 into the recess portions 23 of the mold. Thus, with the slush box locked into tight relationship with the opening of the cavity in the mold, the mold carrier is then ready to be operated or rotated when the slush box carriage is lowered by the return of the ram to a lower position.

In normal operation, the mold carrier is given two rotations in each direction by operation of the speed control and reversing means 24 in the electric circuit for motor 14 and then the mold carrier by the activation of the brake circuit 25 is stopped in the position whereby the plungers 22 can be released to allow the slush box to rest on the elevating means or carriage 20 which then is lowered away from register with the mold by retraction of the hydraulic ram 19.

Thus, the molds are ready for the cooling cycle at which time the hot oil valve 1 is closed and the cold oil valve 2 is opened to permit cold oil to flow into and through the mold to cool the mold down to a temperature which will permit the molded article to be stripped from the mold. Usually the cold oil is at about 100 to 150° F. at the time it is being pumped into and through the mold. With the molded article stripped or pulled from the mold, the molds are cleaned to make them ready for another cycle. Thus, with this type of operation it is possible to put the mold through a mold cycle whereby a molded article is formed in about 4 to 6 minutes and thereby give a relatively high rate of production on an hourly basis for this type equipment.

Referring to FIG. 2 a method of molding skins or shells is shown. In this apparatus it will be noted that the oil flows into and through the mold and is then returned by an auxiliary line through the rotary mount 9 to the oil supply tank. This means of heating and cooling the mold wherein the hot oil comes through one mounting of the mold carrier and the cold oil comes through the other reduces the amount of heat required to heat and cool the mold and also reduces the amount of volume to be heated and cooled each cycle to thereby decrease the time required for each molding cycle, and the cost of heating and cooling the molds.

Referring again to FIG. 2 it should be evident that the hot oil flows from the hot oil tank, not shown, through valve 1 on through the flexible connection and the rotary joint of the mount through the flexible connections into and through the mold up to the Y (indicated by numeral 26). The Y is formed where the hot oil line returns to the hot oil tank by lines 27 and 28 and hot oil outlet valve 29 instead of flowing through line 30 as valves 2 and 34 are closed. Therefore the cold oil remaining in the line coming from the cold oil tank beyond this Y (26) will hardly be affected except in the turbulent area adjacent the Y (26). The turbulence will give a slight temperature gradient downstream from the Y in the cold oil line.

Conversely, the cold oil from the supply tank, not shown, is pumped through valve 2 into line 30 of the conduit to the molds. Since valves 1 and 29 are closed, the cold oil flows through the molds to the Y, point 31, and returns through lines 32 and 33 and valve 34 to the cold oil supply. This method of moving the hot oil and cold oil through the mold reduces the shock on the mold and reduces the tendency for the mold to crack and leak.

Where the heat and cooling medium flows through the apparatus as shown in FIG. 4, the cooling takes place all the way through both mounts, thus increasing the amount of heat required to cool and heat this extra length of pipe and apparatus thereby increasing the time required to bring the mold up to and down to the desired temperatures. Also, the method of replacing all the hot oil with cold oil in each cycle increases the cycle time, too.

Normally, the excess molding powder in the mold drops back into a slush box when the mold is in the position shown in FIG. 3 but some powder will remain on the shoulders 35 and other parts of the mold and thereby will result in the skins or related molded article having thick sections. To avoid this difficulty, the slush box carriage 20 is fitted with an air line 36 and a nozzle 37 for directing a stream of air into the opening 38 of line 39 which has preferably a rotating head 40 on the other end thereof. This rotating head 40 preferably has two short pipe nipples 41 for directing a blast of air against the shoulders 35 of the mold and other parts of the mold cavity to dislodge any excess unfused molding powder. The time of air blast is controlled by the manual operation of the air valve 42 or alternately by an automatic programmer such as shown in FIG. 5.

Referring to FIG. 5, leads 44 and 45 are conveying an electric current from a power source not shown to the primary side of a transformer 46. This current is shown as being 440 volt, 60 cycle, single phase. In the transformer the voltage in the primary winding 46 is stepped down on the secondary winding 47 and split into a 110 volt and a 220 volt source. The 220 volt, 60 cycle, single phase current is conveyed from the secondary 47 of the transformer by conduits 48 and 49 to the motor 14 by the parallel circuits containing the speed and reversing control box 24 and the brake circuit control box 25. The speed and reversing control box contains equipment for varying the speed of the motor and determining the direction of its rotation while the brake circuit control box contains equipment for applying a brake to the motor to stop it in any desired position.

The 110 volt, 60 cycle single phase current from the secondary 47 of the transformer is conveyed by the conduits 50 and 51 to an automatic programmer 52. The automatic programmer has leads coming therefrom to a number of limit switches designated by the abbreviation LS plus a number, control relays designated as CR plus a number, and timed delayed relays designated as TDR plus a number, for placing in the circuit at the desired time either in parallel or series with various solenoid valve mechanisms when the automatic programmer so directs.

The action of the automatic programmer which comprises a series of stepping relays which have been programmed to direct the opening and closing of certain limit switches and control relays in the desired sequence to achieve the desired operation of the equipment of FIGS. 1 and 2 in the manner herein described. For instance, with input voltage imposed on the conduits 50 and 51, the starting switch 53 may be closed to activate the automatic programmer. Thus, with the starting button 53 in the closed position and with the switch 54 in the automatic position instead of the manual position 55, the stepping switch in the automatic programmer is then in its first position; thus, the hot oil outlet valve 1 will open due to the energization of the control relay CR1A. With the hot oil valve 1 open due to the activation of the control relay CR1A which in turn energizes the solenoid circuit 56, then the limit switch LS1 closes to cause the automatic programmer to receive an impulse to move it to position 2. With the automatic programmer in position 2 the hot oil valve 1 remains open and also the hot oil outlet value 29 opens as control relay CR2 is energized and thereby activates the solenoid circuit 57 to effect an opening of the hot outlet valve 29. Similarly, the moving of the automatic programmer to position 2 closes control relay CR1B to energize the solenoid circuit 58 to effect closing of the cold oil outlet valve 34. Further, the position of the automatic programmer in position 2 closes control relay CR3 to activate solenoid circuit 59 to close cold oil inlet valve 2 and also start the delayed time relay TDR1. This time delayed relay TDR1 is set to give the hot oil flowing through the inlet valve 1 sufficient time to bring the mold to the desired temperature, preferably above the fusing point of the thermoplastic resin. The passage of the time set on the time delayed relay TDR1 causes the automatic programmer to move to position 3.

With the automatic programmer in position 3 the energization of the circuit is the same to leave the hot and cold valves in the respective positions they were in when the automatic programmer is in position 2. Further, upon the positioning of the automatic programmer in step 3, it becomes necessary to operate the speed and reversing controls to rotate the mold carriage in a position to place the mold opening in a position to receive the slush box. This may be achieved manually or by synchronization of the automatic programmer with the speed control and reversing circuits of the motor. With the mold carriage in this position the speed and reversing controls as well as the brake circuit controls are operated to stop the mold in this position and then the limit switch LS2 closes to advance the automatic programmer to position 4.

With the automatic programmer in position 4 the valve positions are not changed but the slush box is elevated by activation of the control relay CR5 to energize the solenoid mechanism 60 which in turn permits the hydraulic fluid to activate and move the hydraulic ram 19 upward to bring the slush box into register with the molds in the manner shown best in FIG. 3. When the slush box and molds come into register as shown in FIG. 3 the limit switch LS5 is closed, which caused the automatic programmer to move to position 5.

In position 5 the valves are in the same position as they have been in steps 3 and 4. With the automatic programmer in step 5 the control relay CR9 is energized and thereby energizes the solenoid 61 to activate the valve controlling the air supply operating the ram plunger 22 of the air clamps 21. Thus, with control relay CR9 activated the slush box is clamped and locked into engagement with the molds. Also, the delayed time DT1 is energized when the automatic programmer moves into position 5 and when the time set on the delayed timer DT1 passes the automatic programmer moves into position 6.

With the automatic programmer in position 6 the valve positions on the hot and cold oil lines will be the same as in the previous positions 3, 4 and 5 but control relay CR6 will be activated to cause the retractor solenoid 62 to be energized and thereby admit hydraulic fluid to the top of the ram 19 to cause the ram to move downward to disengage the carriage 20 from the slush boxes 18 and then limit switch LS6 is closed to cause the automatic programmer to move to position 7.

With the automatic programmer in position 7 the valve positions are not changed on the hot and cold lines but the speed and reverse control on the motor 14 are activated and the motor is started to cause the mold carriers to rotate through an arc of at least 180° in as many increments as may be desired and reverse at which time the limit switch LS8 trips to move the automatic programmer to position 8 which again causes the mold to rotate and reverse by activation of the speed and reversing control together with the braking control without changing the valve position before tripping limit switch LS9 to move the automatic programmer into position 9.

With the automatic programmer in position 9 the position of the valves in the hot and cold oil lines are not affected but the mold continues to rotate forward, at which time the limit switch LS10 trips to move the automatic programmer into position 10. With the automatic programmer in position 10 the mold continues to rotate forward and limit switch LS3 is tripped to activate the brake circuit to stop the rotation of the mold carriage to leave the molds in a position whereby the slush box may be removed when the automatic programmer is moved to position 11 by the tripping of the limit switch LS3.

With the automatic programmer in position 11 the control relay CR5 is activated to cause the solenoid 60 to open a valve to admit hydraulic fluid to the bottom of the ram 19 to move the carriage 20 upward into contact with the bottom of the slush box. Also, limit switch LS5 is tripped to energize control relay CR10 which in turn energizes the solenoid 63 to open valve 42 to admit air into pipe 39 and thus remove any molding powder that might be hanging loose within the mold cavity and especially on the shoulders 35. This also moves the automatic programmer to position 12 to de-energize control relay CR10.

With the automatic programmer in position 12 the control relay CR9 is de-energized and thereby de-energizes the circuit 61 to operate the air valve on the air clamps to permit the air driven hydraulic cylinder to move pin 22 and thereby retract pin 22 from the recess 23 of the mold to thereby unlock the mold from the slush box. Also, delayed time DT2 has been energized by moving of the automatic programmer to position 12 and when the time set thereon expires the automatic programmer is moved to step 13. This causes the control relay CR5 to be energized and in turn to energize the solenoid circuit 60 to admit hydraulic fluid into the hydraulic cylinder 19 to move the carriage 20 downward with the slush boxes 18 resting thereon. This also trips limit switch LS6 to move the automatic programmer to position 14.

With the automatic programmer in position 14 the mold is maintained under heat while in an upside down position to complete the fusing of the molding powder. The mold remains in this position until the time set on the delayed timer relay DTR4 is spent. This in turn moves the automatic programmer to step 15.

With the automatic programmer in step 15 the speed and reversing control on the motor is activated to cause the mold to rotate and reverse and return to the normal position with the mold cavity downward with the molded goods in a position to be stripped when the mold has cooled. Also, limit switch LS7 closes to move the automatic programmer into position 16.

With the automatic programmer in position 16 the delayed time relay DTR2 starts to run and runs for the specified time at which time it causes the automatic programmer to move to step 17.

With the automatic programmer in position 17 the appropriate control relay CR1A is energized to cause the hot oil valve 1 to close by de-energizing the solenoid circuit 56 and at the same time the control relay CR1B is energized to energize solenoid circuit 58 to open cold oil valve 34.

With the automatic programmer in position 17, the cold oil outlet valve 34 opens and limit switch LS7 closes to move the automatic programmer to position 18.

Closing of limit switch LS7 and positioning the automatic programmer in station 18, activates control relay CR2 which in turn activates solenoid 57 to close hot oil valve 29. Simultaneously, control relay CR3 closes to cause solenoid 59 to open cold oil inlet valve 2 to cool the molds. Delayed timer relay DTR3 is started when the automatic programmer reaches station 18. The delayed timer relay DTR3 is set to give the cold oil time to cool the mold to the desired stripping temperature, usually about 100 to 150° F. or about 50° F. below the fusing point of the thermoplastic. When the time set on delayed timer relay DTR3 expires, the skin in the mold may be stripped out by hand, preferably with the aid of a small blast of air from a portable air line. The expiration of time set on the delayed timer relay DTR3, usually 0 to 5 minutes, is signalled by the illumination of light 64. With the skin removed from the mold, the mold is cleaned and another cycle may be started by pushing in switch 53.

From the foregoing discussion it should be readily apparent that one of the principal advantages of this invention is that it provides a method for precisely uniform and repeatable temperature control of the mold. In other heating methods such as by radiant heat, various areas of the mold may be overheated while others are underheated. Consequently, the material molded in a mold which is overheated in spots and underheated in others will frequently show signs of a scorching and other attributes of thermodegradation while in other areas there will be signs of incomplete or poor fusing of the thermoplastic material resulting in a poor quality product.

Thus, this method permits the molds to be heated with a suitable heating oil such as those of the diphenyl or diphenyl ether type or their mixtures to obtain precise, repeatable and uniform temperature throughout the mold to thereby permit molding materials such as the polypropylene resins that have a very close range of molding temperature to be molded without thermal degradation or scorching. On the other hand, this method may be readily utilized with the plasticized polyvinyl chlorides and related vinyl resins where these resins are either liquid or dry powders.

Specifically, it should be noted that an advantage of this invention is that it permits relatively large and long objects such as skins for automobile crash pads to be produced in a very short molding cycle with relatively compact apparatus and therefore avoids the necessity for a large area for a given volume of production.

While certain representative embodiments and details have been shown for the purpose of illustrating the invention, it will be apparent to those skilled in this art that various changes and modifications may be made therein without departing from the spirit or scope of the invention.

What is claimed is:

1. In a process for slush molding an article, the steps comprising:
   (1) heating an open-ended mold to a temperature above the fusing temperature of the thermoplastic material by feeding a heating medium through the mold;
   (2) locking the mold and an open-ended slush box together with the open ends in register;
   (3) loading the mold by rotating the mold while in contact with the slush box to thereby form a skin of the desired design and shape within the mold cavity;
   (4) moving the excess unfused thermoplastic material from the mold;
   (5) cooling the mold below the fusing temperature of the thermoplastic material by feeding a cooling medium to and through the mold to displace the heating medium with the paths of the heating and cooling medium to and from the mold having a common path only through the mold, and
   (6) stripping the molded article from the mold when the mold has cooled.

2. The method of claim 1 wherein the heating and cooling medium flows through the common path in opposite directions.

References Cited
UNITED STATES PATENTS

| | | | |
|---|---|---|---|
| 2,847,190 | 8/1958 | Slattery | 165—29 X |
| 2,736,925 | 3/1956 | Heisler | 264—310 X |
| 2,880,468 | 4/1959 | Mooney | 264—302 X |
| 3,117,346 | 1/1964 | Bertin. | |
| 3,134,831 | 5/1964 | DeFusco | 264—302 X |
| 3,293,344 | 12/1966 | Barnes | 264—302 |
| 3,301,925 | 1/1967 | Engel | 264—310 |
| 3,316,339 | 4/1967 | Breneman | 264—310 |
| 3,388,429 | 6/1968 | Barnett. | |

ROBERT F. WHITE, Primary Examiner

A. M. SOKAL, Assistant Examiner

U.S. Cl. X.R.

18—26; 264—310